United States Patent [19]

Karlberg

[11] Patent Number: 5,409,607
[45] Date of Patent: Apr. 25, 1995

[54] OIL SPILL COLLECTION AND REMOVAL DEVICE

[76] Inventor: Douglas F. Karlberg, 3012 Victor St., Bellingham, Wash. 98225

[21] Appl. No.: 132,376

[22] Filed: Oct. 6, 1993

[51] Int. Cl.⁶ ............................................. E02B 15/04
[52] U.S. Cl. ................................... 210/242.3; 210/923
[58] Field of Search .................. 210/242.3, 923, 726, 210/170

[56] References Cited

U.S. PATENT DOCUMENTS

| | | | |
|---|---|---|---|
| 3,708,070 | 1/1973 | Bell | 210/242.3 |
| 3,966,615 | 6/1976 | Petchul et al. | 210/923 |
| 3,983,034 | 9/1976 | Wilson | 210/923 |
| 4,182,679 | 1/1980 | Van Hekle | 210/923 |
| 4,372,854 | 2/1983 | Szereday | 210/242.3 |
| 4,554,070 | 11/1985 | Jordan | 210/242.3 |

Primary Examiner—Christopher Upton
Attorney, Agent, or Firm—Todd N. Hathaway

[57] ABSTRACT

An apparatus for collecting and removing contaminant material floating on the surface of a body of water, e.g., an oil slick. There are first and second boom portions which capture and direct the slick into a skimmer assembly which is mounted at an apex between the booms. The skimmer assembly incorporates three transversely extending cushions which serve as barriers or weirs: The first cushion reduces surface chop and prevents floating material from entering the assembly, the second cushion is partially submerged so as to act as submersion skimmer, increasing the thickness of the oil layer and slowing the current flow, and the third cushion is mostly submerged so as to act as a weir skimmer, over which the oil passes into a collection sump. The combined effect of the transverse barriers enables the system to be operated under adverse weather conditions and at relatively high speeds.

14 Claims, 5 Drawing Sheets

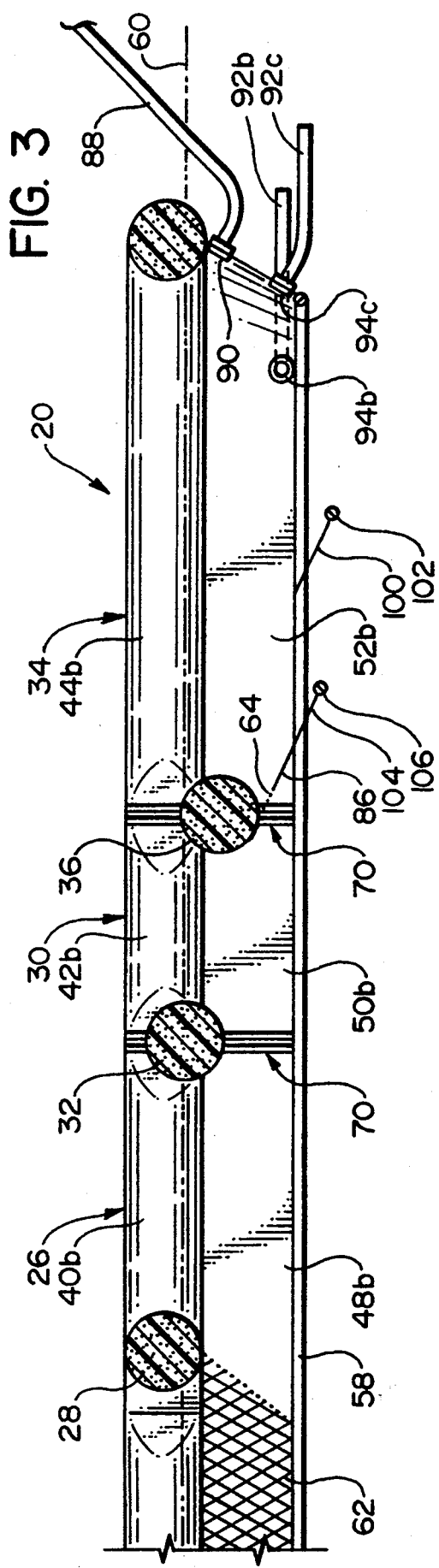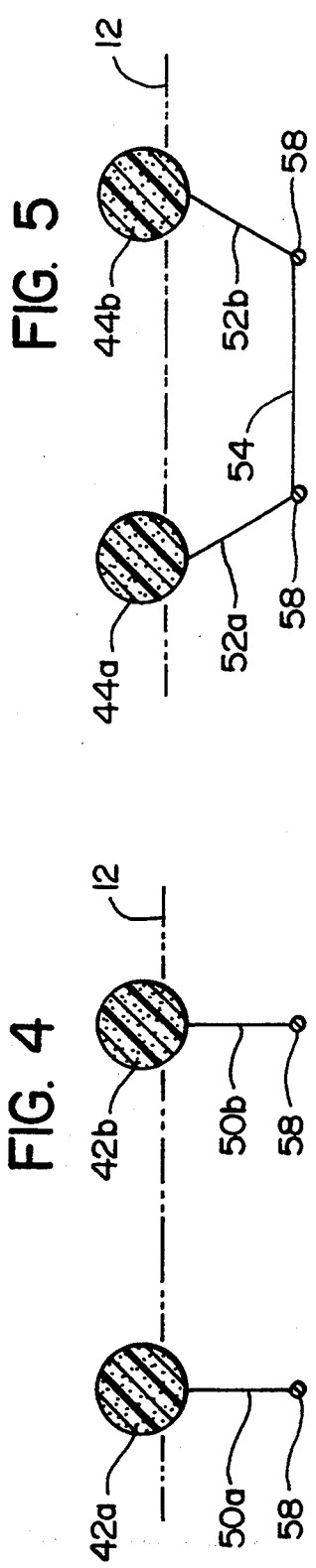

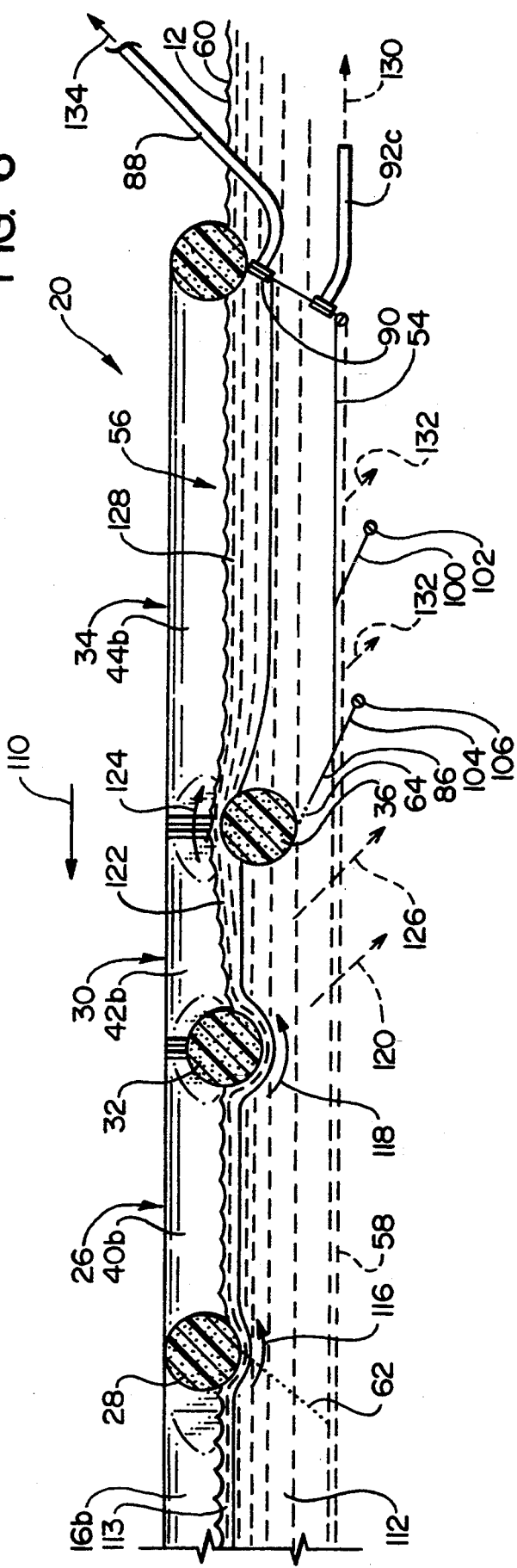

OIL SPILL COLLECTION AND REMOVAL DEVICE

FIELD OF THE INVENTION

The present invention relates to the collection and removal of waterborne contaminants, and more particularly, to a boom and skimmer device which is towed by one or more vessels to collect oil spills.

BACKGROUND OF THE INVENTION

The harmful effects of oil spills in marine and fresh water environments are well known. Typically, such spills take the form of relatively thin "slicks" oil floating on the surface of the water. A major challenge in most clean-up operations is collecting these slicks and somehow concentrating them so that the material can be removed from the body of water. One device which has been used in the past for collection of oil spills is a simple U-shaped boom which is towed by two vessels. Oil is captured between the open ends of the boom and collected at the closed end of the "U". A variation has been to add a weir skimmer at the closed end of the boom; as is known to those skilled in the art, a weir skimmer is a collection device having a shallow barrier over which the slick passes for concentration in a collection area.

Traditional U-shaped booms have proven modestly successful, but only if the weather and other conditions are near ideal. Surface "chop" or other wave action tends to become greatly magnified at the closed end of the boom, with the result that spillage or damage may occur under even relatively mild conditions. Furthermore, the apparent velocity of the collected material becomes greatly accelerated near the closed end, making the liquid difficult to control and contain. These complications are particularly detrimental to the operation of a weir skimmer: simply put, the increased chop and velocity tend to push oil and water over the weir indiscriminately, rendering it incapable of collecting and concentrating the oil slick as intended. Also the weir skimmer can easily be damaged by foreign objects (e.g., garbage and floating wood), especially as these may be propelled by the additional turbulence which occurs at the closed end of the boom. However, it should be noted that a simple U-shaped boom lacking a weir skimmer provides only limited concentration and containment of an oil slick, making it very difficult to remove this material from the surface of the water.

Accordingly, there exists a need for an effective system for capturing and collecting oil spills, even under relatively adverse sea conditions. The need also exists for such a device which will permit relatively higher speeds of operation by the towing craft and which can be operated in the presence of floating debris without fear of damage. Still further, there is a need for such a device which provides for increased concentration and containment of the collected oil, so as to facilitate its removal from the body of water.

SUMMARY OF THE INVENTION

The present invention has solved the problems cited above, and is an apparatus for collecting and removing a contaminant material floating on a surface of a body of water. Broadly, this comprises first and second boom portions for capturing the floating contaminant material and directing this to an apex between the boom portions, and a skimmer assembly attached to the boom portions for receiving a flow of the contaminant material which is directed to the apex. The skimmer assembly comprises (a) a first transverse barrier member positioned substantially at a surface of said body of water, for reducing surface chop on said flow and blocking floating debris from entering the assembly, (b) a second transverse barrier member positioned downstream of the first member, the second barrier member being partially submerged so as to slow the flow of material relative to the assembly, and so as to form a submersion plane skimmer which forces water flowing under the second barrier out of a bottom of the assembly, while the contaminant material flowing under the second barrier forms a relatively thicker layer downstream thereof, and (c) a third transverse barrier member positioned downstream of the second member, the third barrier member being mostly submerged so as to form a weir skimmer having an exposed upper portion over which the floating contaminant material passes into a collection area and a submerged lower portion under which the water passes out of the skimmer assembly.

The skimmer assembly may comprise first and second generally parallel wall portions, the wall portions being spaced apart to form a longitudinal channel for the flow of contaminant material which is received by the assembly, with the barrier members being mounted between the wall portions so as to extend transversely across the channel. The sidewall portions of the skimmer assembly may comprise floatation members extending longitudinally along side the channel, and longitudinal skirt portions extending downwardly from the floatation members for confining the flow of contaminant material to the channel.

The transverse barrier members may each comprise a rigid, elongate floatation member mounted to the longitudinal floatation members of the sidewall portions so as to extend transversely across the channel. The elongate floatation members may be generally cylindrical in shape so as to facilitate the flow of the contaminant material and water past the barrier members.

The collection area for the floating contaminant material may comprise a rearward portion of the skimmer assembly having an enclosed area which forms a sump for holding the contaminant material. The sump may comprise a rearward floatation member which substantially encloses the collection area, a skirt portion which extends downwardly from the rearward floatation member, and a generally horizontal bottom panel which is mounted to the skirt portion so as to provide a substantially closed bottom for the sump. Means may be provided for withdrawing the contaminant material from the sump, and also for releasing water which accumulates therein.

BRIEF DESCRIPTION OF THE DRAWINGS

FIG. 3 is an elevational view of a cross-section taken along a longitudinal center line of the skimmer assembly shown in FIG. 2;

FIG. 4 is an end view of a cross-section taken along line 4—4 in FIG. 2, showing the floatation members of the leading two sections of the skimmer assembly, and the skirt portions which depend from these numbers;

FIG. 5 is an end view of a cross-section taken along line 5—5 in FIG. 2, showing the depending skirt and bottom panel which form a collection sump for the oil;

FIG. 6 is a cross-sectional view taken along line 6—6 in FIG. 2, showing the dynamic operation of the skimmer assembly, and the flow of oil and water therethrough;

DETAILED DESCRIPTION a. Overview

Figure 1:
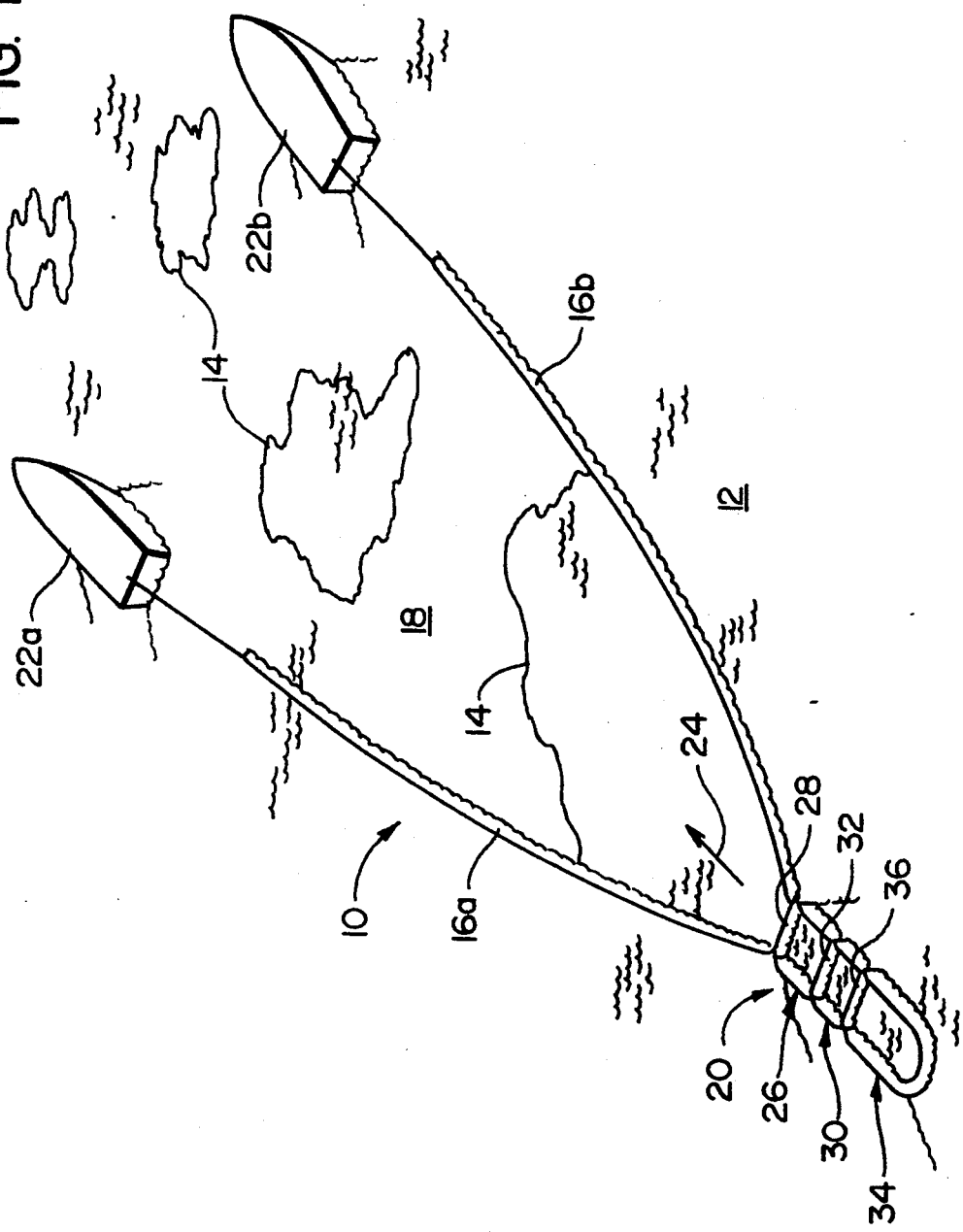
FIG. 1 is a perspective view of an oil spill collection apparatus in accordance with the present invention, this being towed between two vessels so as to capture patches of oil floating on a body of water.

FIG. 1 presents an environmental view showing the apparatus 10 of the present invention being towed across the surface of a body of water 12 so as to capture and collect slicks of oil 14 floating thereon.

As can be seen, the collection apparatus 10 is made up generally of first and second elongate boom portions 16a, 16b, which form a generally V-shaped collection area 18, with a skimmer assembly 20 being mounted at the apex of the "V". The first and second boom portions are connected, respectively, to first and second watercraft 22a, 22b, which tow the assembly through the body of water in the direction indicated generally by arrow 24, so that the slicks 14 are captured and funnelled between the booms and into the skimmer assembly. The watercraft may be tow boats, fishing boats, or any other suitable watercraft; also, it will be understood that a single water craft may be used in place of the two which are shown, as by positioning this between the ends of the booms and using poles, paravanes, or other suitable devices for keeping the ends spread apart.

The boom portions 16a, 16b are made up generally of a series of floats having depending skirt portions which prevent the oil slick from escaping under the floating barrier.

The skimmer assembly 20, in turn, is made up of three subassemblies or sections which, as will be described below, serve to slow the fluid flow and smooth out the wave action, and simultaneously concentrate the oil for collection and removal. The first section 26 has a transversely extending floating cushion 28 which supports a net and acts to block debris from entering the skimmer, as well as reducing surface chop and slowing current velocity. The second section 30, in turn, has a partially submerged cushion 32 which acts as a submersion plane skimmer, forcing some of the water out of the bottom of the assembly and increasing the thickness of the oil layer behind the cushion. The final section 34 is U-shaped and provides a closed bottom sump for collecting and holding the oil for subsequent removal; the oil enters the sump over a mostly submerged cushion 36 which acts as a weir skimmer, so that oil passes over the top of the cushion while the water flows out underneath. The transversely extending cushions 28, 32, and 36 are sufficiently rigid that they maintain their perpendicular orientation when subjected to the flow of the oil and water.

Having provided an overview of the present invention, its structure and operation will now be described in greater detail.

b. Skimmer Assembly

Skimmer assembly 20 is made up generally of three subsections 26, 30, and 34 linked in end-to-end relationship. The assembly is preferably constructed of a tough, oil-resistant fabric, suitable for use in a marine environment, such as polyvinyl fabric for example, while floatation is provided by foam log cores or other suitable floatation devices. This construction is similar or substantially identical to that of the two boom portions 16a, 16b, and has the advantage that the two section (i.e., the skimmer assembly and the booms) exhibit similar buoyancies and will rise and fall in step through swells; this renders the apparatus of the present invention much easier to handle and more durable than traditional boom/skimmer combinations, wherein the weir skimmers have typically been fabricated of steel, aluminum, or fiberglass.

Figure 2:
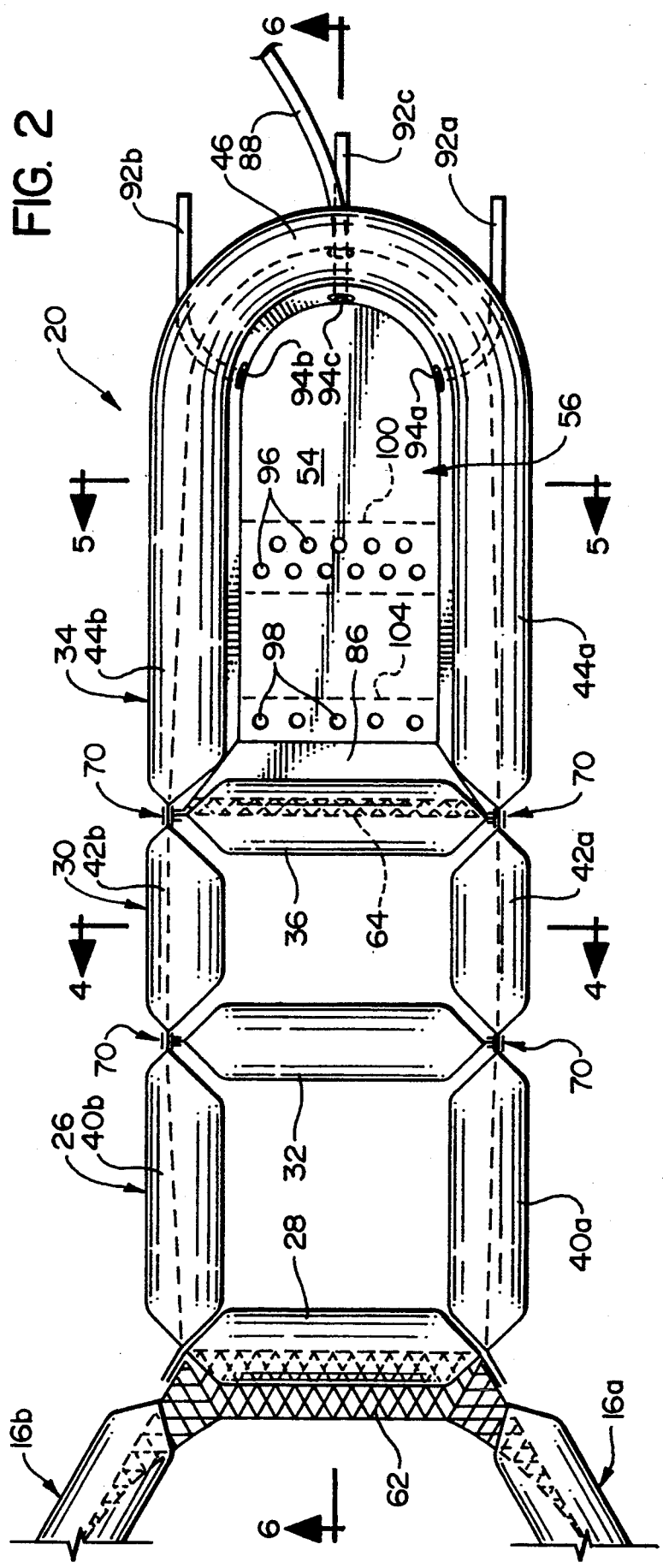
FIG. 2 is a plan view of the oil skimmer assembly of the apparatus as shown in FIG. 1.

As can be seen in FIG. 2, the sidewalls of the skimmer assembly 20 are provided by a series of parallel cushions 40a,b, 42a,b, and 44a,b, which define an elongate, straight sided channel for passage of the oil and water through the assembly, the aft end of the channel being closed by the U-shaped end cushion 46 of the collection sump. As is shown FIG. 3, each of the sidewall cushions is provided with a depending, longitudinally extending skirt portion 48a,b, 50a,b, 52a,b (one side only shown in FIG. 3) which extends downwardly into the water to prevent the escape of oil. The bottom of the channel is open in sections 26 and 30 to permit the downward escape of water, but a bottom panel 54 connects the sidewalls 52a,b of the aft-most section 34 to form a closed-bottomed sump 56. A lead line 58 (see FIG. 4) is attached along the bottom of the skirt sections, so as to maintain their generally vertical orientation, and to also provide a ballasting effect which improves the stability of the assembly. In the aft-most section 34, the lead line 58 is preferably rigged somewhat inboard of the sidewall floatation cushions 44a, 44b, so that the skirt portions 52a, 52b tend inwardly as shown in FIG. 5; this maintains a degree of outward tension on the bottom panel 54, so as to hold the panel relatively flat and horizontal in the water.

c. Transversely Extending Cushions

The three transversely extending cushions 28, 32, and 36 are relatively rigid members which extend perpendicularly across the flow of fluid through the skimmer assembly. Each of these transversely extending cushions consequently serves as a barrier which plays a particular, sequential role in the operation of the assembly.

The leading transverse cushion 28 is mounted at the entrance into the first subsection 26 of the skimmer assembly, where this is joined to the trailing edges of the two boom portions 16a, 16b. Cushion 28 floats substantially on top of the surface 60 of the body of water, with relatively little of the cushion being submerged. A trawl net 62 is attached along the bottom edge of the cushion and extends generally downwardly and forwardly from this; the leading corners of the net 62 are attached to the first and second boom portions 16a, 16b, much in the manner of a conventional fishing trawl, and may extend well forward of cushion 28. The trawl net thus spans the rearward ends of the two boom portions and helps hold these together, imparting a degree of stability and helping this portion of the apparatus maintain its intended configuration.

The entry cushion 28 and net 62 serve several important functions with respect to the skimmer assembly. Firstly, the cushion acts as a breakwater to reduce sea state, rendering the open surfaces behind the cushion relatively calm. Secondly, the cushion and net block the entry of trash, floating wood, and so forth into the skimmer, protecting the latter from becoming clogged or damaged by foreign objects. Moreover, in flowing under the cushion, the oil and water lose a degree of their velocity relative to the skimmer; in other words, an initial velocity component is imparted to the oil and water, and they begin to move forward with the skimmer rather than remaining stationary.

The second transverse cushion 32, in turn, is mounted so as to be partially submerged, preferably to about one-half its depth. In this position, the second cushion serves several important functions. Firstly, because it extends well down into the path of the oil and water, it acts as a major barrier to the flow, greatly reducing its velocity relative to the skimmer. Also, the cushion "knocks down" most of the sea state which remains after the first cushion 28. Moreover, the second cushion acts as a submersion plane skimmer: Water flowing beneath the cushion is forced out through the open bottom of subsection 30, while the lighter oil "bubbles up" and collects behind the cushion, substantially increasing the thickness of the oil layer. Finally, cushion 32 acts as a "siphon-back" prevention device: If the direction of the current relative to the skimmer assembly should change direction, due to the assembly being maneuvered or stopped, or for other reasons, cushion 32 will prevent the oil which has been collected in section 30 from flowing back out of the assembly.

The final transverse cushion 36 is mounted so as to be almost fully (e.g., about 95%) submerged. In this position, the cushion acts primarily as a weir skimmer, but may also function as submersion plane skimmer. Under normal conditions, the remaining current pushes the layer of oil over the top of the cushion so that it collects in the sump, while the heavier water passes under the weir and leaves the system; because the velocity of the flow has ben greatly reduced at this point, and wave action has been virtually eliminated, the layer or sheet of oil flows smoothly over the weir and its operation can be very efficient.

Under adverse conditions, however, such as very heavy chop or high current, some oil may be pushed under cushion 36. In the event that this happens, the oil will rise into the sump through a vent 64 which is provided under the cushion by a section of netting.

To facilitate obtaining finer cuts of oil, a rearwardly extending flap (not shown) may be added to the upper edge of the weir cushion, with floatation being mounted at the trailing edge of the flap. This forms a lengthened horizontal surface over which the oil must pass to enter the collection sump; when properly positioned relative to the water line, this permits a very thin cut of oil, for example diesel oil, to be collected.

Weir cushion 36 also serves to remove whatever sea state and current remain after the second cushion 32. This renders the sump 56 a very calm and stable area in which the collected oil can be retained for an extended period, and from which it can easily be pumped or otherwise removed.

From the foregoing, it will be understood that the levels of the transverse cushions relative to the water line (i.e., their degree of submergence) is important to the proper operation of the skimmer assembly. Proper positioning of the cushions can be achieved in many cases by ballasting, as with metal or partial flooding. Furthermore, in some cases, it is highly desirable that the positions of the transverse cushions, particularly the second and third members 32 and 36, be adjustable in a field environment so as to be able to tailor the configuration of the skimmer assembly to prevailing conditions or the material which is to be collected. For example, if the current or towing speed is very slight (e.g., one-half knot) it may be desirable to raise the middle cushion 32 so that the oil does not have to pass under as large a submerged portion of the cushion, and lower the rearward cushion 36 so that the oil does not have to be forced over as large a "hump" to enter the collection sump. Conversely, under severe conditions, it may be desirable to lower the middle cushion 32 and raise the level of the rearward cushion 36.

Figure 7:
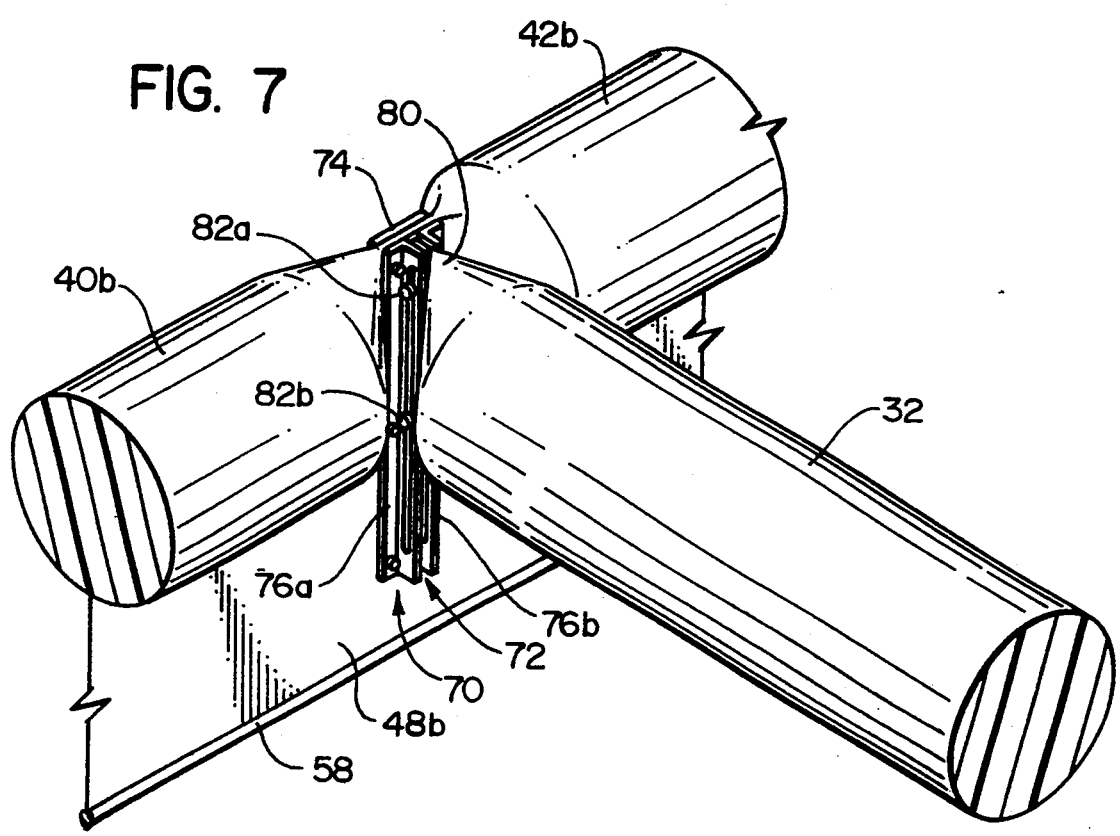
FIG. 7 is a perspective view of a bracket assembly which permits vertical adjustment of the transverse barriers of the skimmer assembly relative to the water level.
Figure 8:
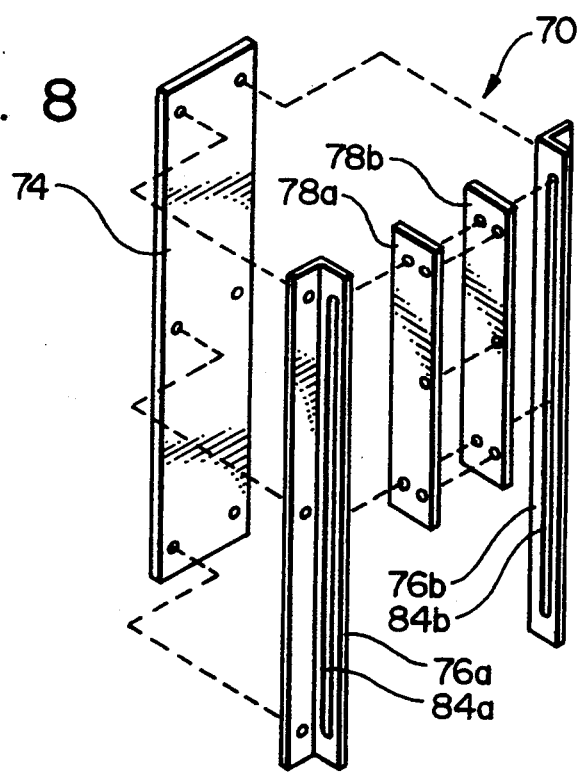
FIG. 8 is an exploded view of the adjustable bracket assembly of FIG. 7.

FIGS. 7–8 illustrate the structure which enables this height adjustment. As can be seen, there is a sliding clamp assembly 70 which joins the end of transverse cushion 32 to the sidewall which is formed by longitudinal cushions 40b and 42b; a substantially identical arrangement is used at the other end of cushion 32, as well as at the ends of the rearward transverse cushion 36.

Sliding clamp 70 provides a vertical channel 72 in which the end of the cushion is received and can be shifted to the desired position. Referring also to the exploded view of FIG. 8, it can be seen that there is an outer face plate 74 which fits against the surface of a flat stretch of fabric between floats 40b and 42b, and first and second inner guide members 76a, 76b which mount to the inner surface of this stretch of fabric and bolt through to the outer plate, firmly clamping the ends of the two sidewall cushions together. Guide members 76a and 76b are spaced apart slightly to form the vertically extending channel 72. First and second slip plates 78a, 78b are mounted on opposite sides of the flattened end 80 of the transverse cushion, so as to form a vertically elongate assembly which is received in channel 72 for sliding movement. First and second bolts 82a, 82b extends through the slip plates and are received in vertical slots 84a, 84b formed in the guide members. Thus, bolts 82a, 82b can be loosened to permit the end of the transverse cushion to be slid vertically to the desired position, at which point the bolts are tightened to lock the assembly in place.

d. Sump Construction

As discussed above, the oil-holding sump 56 is provided with a bottom panel 54 which extends across its length and width (see FIGS. 2–3). A sloped forward panel 86 is mounted to the forward end of the bottom panel, and extends upwardly to the vent netting 64 along the bottom of transverse cushion 36; as was noted above, the netting provides a gap between panel 86 and cushion 36 which permits oil to flow upwardly into the sump.

An oil pump out line 88 is attached to the skirt portion of the sump, at a through fitting 90 which is positioned slightly above the waterline for taking a suction on the oil layer. Water which accumulates in the sump, in turn, is relieved continuously through water discharge lines 92a–c, which are attached to through fittings 94a–c positioned relatively low in the skirt so that these will be in communication with the water layer only. The water discharge lines 92a–c are preferably lengths of flexible hose which direct the water flow back into the slip stream behind the skimmer assembly, although these hoses may be eliminated in some embodiments.

To further facilitate the removal of accumulated water, the bottom panel of the sump is provided with perforations or drain ports 96 and 98, arranged in transversely extending in rows. A transverse flap 100 is mounted to the underside of bottom panel 54 just forward of the rearward row of ports 96, and has a section of lead line 102 attached along its lower edge; flap 100 thus trails back at an angle beneath the drain ports 96 and acts somewhat like a check valve, permitting water to leave the sump through the ports, but preventing water from flowing back up into the sump, by deflecting the water which is flowing across the bottom of the sump, and also by closing off the ports as the assembly rises and falls in swells. The forward row of ports 98 is provided with a closure flap 104 and lead line 106 which operate in substantially the same way; the forward closure flap may be conveniently provided by an extension of the sheet which forms the front panel 86 of the sump.

As with the other sections of the skimmer assembly, the sump may be suitably constructed of polyvinyl fabric and foam log floatation members. However, in some embodiments, it may be desirable to form at least the rear portions of the skimmer assembly of fire-resistant materials so as to permit site burning of the oil in the sump. The present invention is particularly advantageous in this regard, being that the skimmer assembly 20 makes it possible to concentrate the oil from the slicks into a relatively thick mass which will sustain continuous burning. Also, because the apparatus permits rapid collection of the oil, this can be burned before the volatile, more combustible organics evaporate off. In embodiments where the sump is configured for site burning of the oil, various wind-deflecting structures may be incorporated to increase the efficiency of the combustion.

e. Operation

FIG. 6 illustrates the flow of water and oil through the interior of skimmer 20, along the channel defined between the parallel sidewall members of the assembly. The direction of motion skimmer assembly is to the left, as indicated by arrow 110. Consequently, the "flow" which is discussed below is relative to the skimmer, the body of water itself being generally stationary.

As the water 112 and the oil slick 113 enter the assembly from the left, they encounter the entry cushion 28 and flow underneath this in the direction indicated by arrow 116. As this is done, the water and oil pass through net 62, so that this and the cushion 28 exclude trash and other foreign objects which might otherwise damage the assembly. The cushion 28 also knocks down surface chop and slows the relative velocity of the liquid, so that the area behind the cushion is relatively calm.

The channel behind cushion 28 directs the oil and water into a generally linear flow traveling towards the remaining two transverse cushions, greatly enhancing their efficiency. The flow carries the oil under the next, partially-submerged cushion 32, in the direction indicated generally by arrow 118; the oil wells up on the opposite side of the cushion, while a portion of the water column is forced out through the open bottom of the assembly, in the general direction indicated by broken line arrow 120. A relatively thicker layer 122 of oil consequently accumulates in section 30, on the back side of cushion 32.

From section 30, the oil is forced over the weir cushion 36, in the direction indicated by arrow 124, the water flowing out beneath the cushion, as indicated by broken line arrow 126. The collected oil accumulates in a thick pool 128 in sump 56, and water in the sump is discharged through lines 92a–c, as indicated by arrow 130, and through the drain ports 96, 98 in bottom panel 54, as indicated by arrows 132. The collected oil, in turn, is removed through pump out line 88 in the direction indicated by arrow 134, on a periodic or continuous basis, as to a container on a vessel or dock.

It is to be recognized that various modifications may be made to the illustrative embodiments described herein without departing from the spirit and scope of the present invention. Accordingly, the invention is not to be limited except as by the appended claims.

What is claimed is:

1. An apparatus for collecting and removing a contaminant material floating on a surface of a body of water, said apparatus comprising:

first and second boom portions for capturing said floating contaminant material and directing said material to an apex between said boom portions; and a skimmer assembly attached to said boom portions for receiving a flow of said contaminant material which is directed to said apex, said skimmer assembly comprising:

(a) first barrier means comprising at least one transverse barrier member which is positioned substantially atop said body of water, said barrier member having a lower edge which is positioned substantially at said surface of said body of water so as to reduce surface chop on said flow and an upper edge which extends above said surface so as to direct said flow under said lower edge of said member and also block floating debris from entering said assembly;

(b) second barrier means comprising at least one partially submerged transverse barrier member which is positioned downstream of said first barrier means, said partially submerged barrier member having an upper edge which extends above said surface of said body of water so as to block said flow from passing thereover and a lower edge which extends below said surface so as to form a submersion plane skimmer which forces said flow to pass under said partially submerged barrier member, so that water in said flow is forced out of a bottom of said assembly while said contaminant material in said flow floats up behind said partially submerged barrier so as to form a relatively thicker layer downstream thereof; and (c) third barrier means comprising at least one substantially submerged transverse barrier member which is positioned downstream of said second barrier means; said submerged barrier member being substantially rigid and having an upper edge which is positioned substantially at said surface of said body of water and a lower edge which extends below said surface so as to form a weir skimmer which forces said floating contaminant material in said flow over said upper edge of said submerged barrier member and into a collection are behind said member, and forces said water in said flow under said lower edge of said barrier member and out of said bottom of said skimmer assembly.

2. The apparatus of claim 1, wherein said skimmer assembly further comprises:

first and second generally parallel wall portions, said wall portions being spaced apart to form a longitudinal channel for said flow which is received by said assembly, and said barrier members being mounted between said wall portions so as to extend transversely across said channel.

3. The apparatus of claim 2, wherein said collection area for said floating contaminant material comprises:

a rearward portion of said skimmer assembly having an enclosed area which forms a sump for holding said containment material.

4. The apparatus of claim 3, wherein said sidewall portions of said skimmer assembly comprise:

floatation members extending longitudinally alongside said channel; and longitudinal skirt portions extending downwardly from said floatation members for confining said flow of said containment material to said channel.

5. The apparatus of claim 4, wherein said transverse barrier members each comprise:

a rigid, elongate floatation member mounted to said longitudinal floatation members of said sidewall portions so as to extend transversely across said channel.

6. The apparatus of claim 5, wherein said elongate floatation members are generally cylindrical in shape so as to facilitate said flow of said contaminant material and water past said barrier members.

7. The apparatus of claim 4, further comprising:

bracket assemblies for mounting at least one said barrier member to said wall portions, said bracket members being configured to permit adjustment of a level of said at least one barrier member relative to said surface of said water.

8. The apparatus of claim 4, wherein said sump for holding said contaminant material comprises:

a rearward floatation member which substantially encloses said collection area;

a skirt portion which extends downwardly from said rearward floatation member; and a generally horizontal bottom panel mounted to said skirt portions of said sump so as to provide a substantially closed bottom therefor.

9. The apparatus of claim 8, further comprising:

means for withdrawing said contaminant material from said sump.

10. The apparatus of claim 9, wherein said means for withdrawing said contaminant material from said sump comprises:

a suction line attached to said sump so as to be in fluid communication with said contaminant material collected therein.

11. The apparatus of claim 9, wherein said sump further comprises:

means for releasing water which accumulates in a lower portion of said sump.

12. The apparatus of claim 11, wherein said means for releasing water comprises at least one port formed in a lower portion of said skirt portion of said sump.

13. The apparatus of claim 11, wherein said means for releasing water comprises:

at least one drain port formed in said bottom panel of said sump; and a panel member extending downwardly and rearwardly beneath said drain port for preventing water moving across a bottom of said sump from welling up through said drain port.

14. The apparatus of claim 13, wherein said panel member comprises:

a flexible fabric sheet mounted to a lower surface of said bottom panel forwardly of said drain port; and a weight member mounted to a lower edge of said flexible sheet, so that said sheet trails downwardly and rearwardly beneath said drain port in response to water flowing across said bottom of said sump due to forward motion of said skimmer assembly.

* * * * *